Dec. 25, 1962 W. F. SCHALICH 3,070,147
STRETCH GAUGE MEASURING AND STRETCH STROKE LIMITING DEVICE
Filed Oct. 31, 1960 6 Sheets-Sheet 1

INVENTOR
WALTER F. SCHALICH
BY *Hammond & Littell*
ATTORNEYS

Dec. 25, 1962 W. F. SCHALICH 3,070,147
STRETCH GAUGE MEASURING AND STRETCH STROKE LIMITING DEVICE
Filed Oct. 31, 1960 6 Sheets-Sheet 2

INVENTOR
WALTER F. SCHALICH
BY
ATTORNEYS

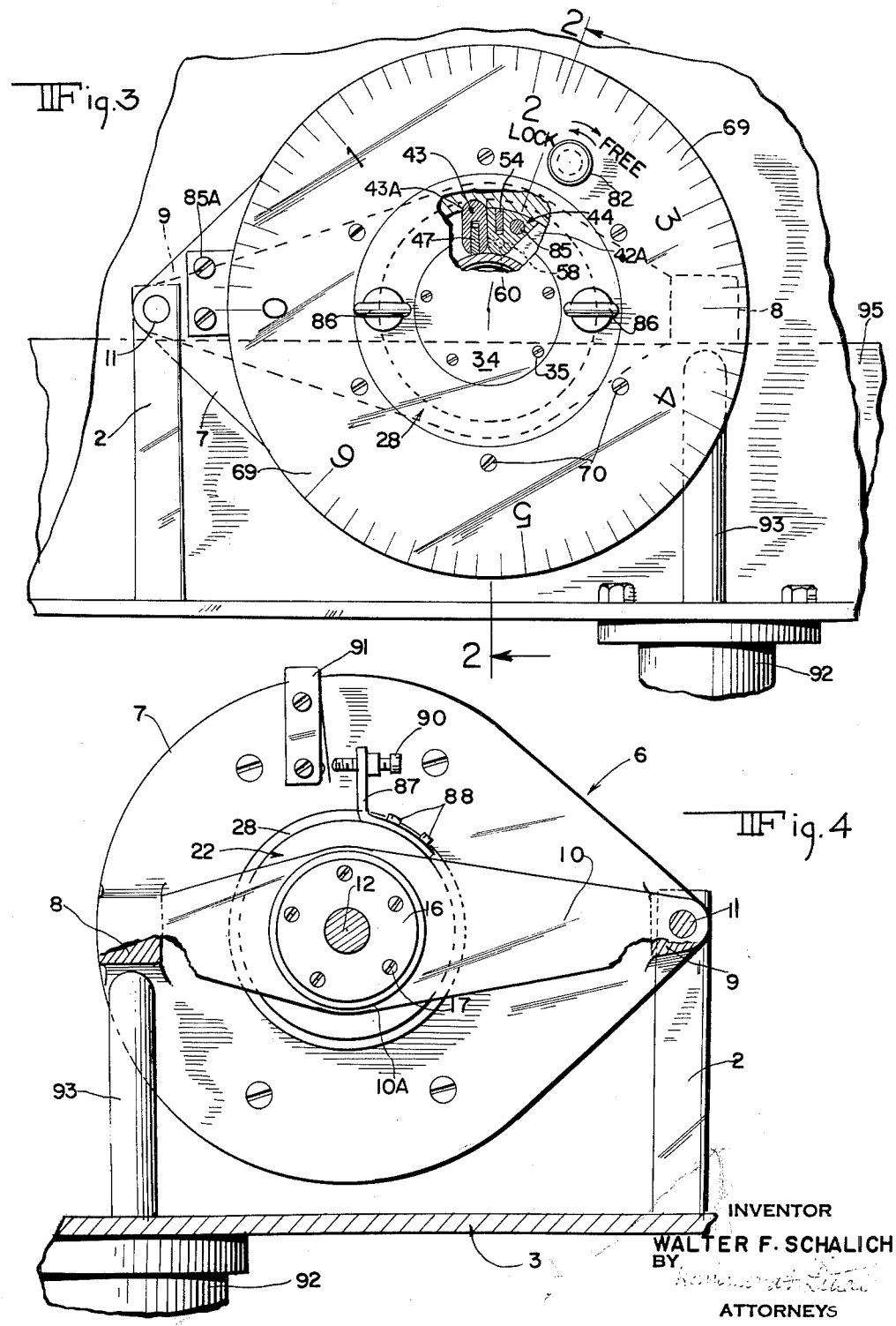

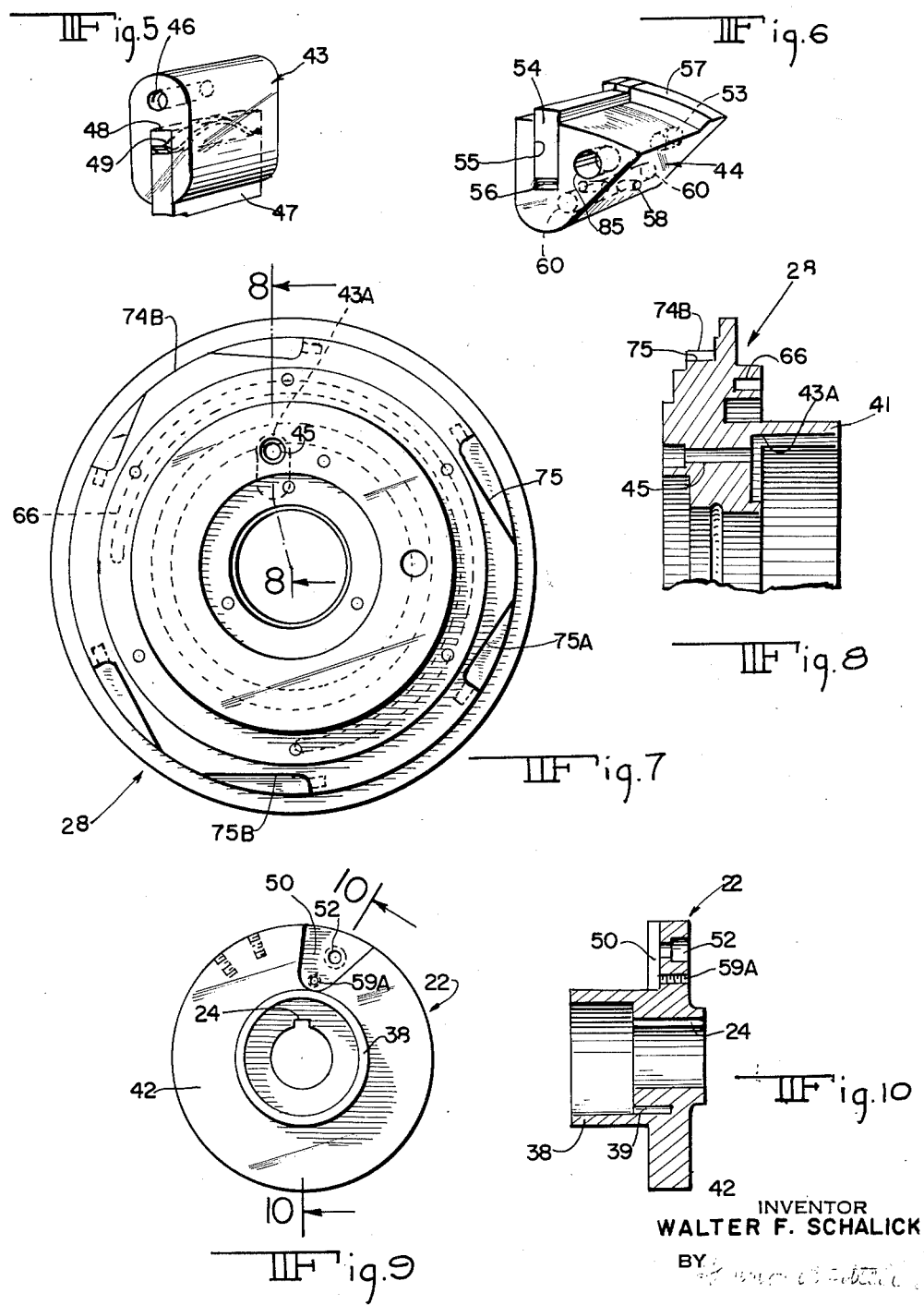

Dec. 25, 1962 W. F. SCHALICH 3,070,147
STRETCH GAUGE MEASURING AND STRETCH STROKE LIMITING DEVICE
Filed Oct. 31, 1960 6 Sheets-Sheet 5

INVENTOR
WALTER F. SCHALICH
BY
ATTORNEYS

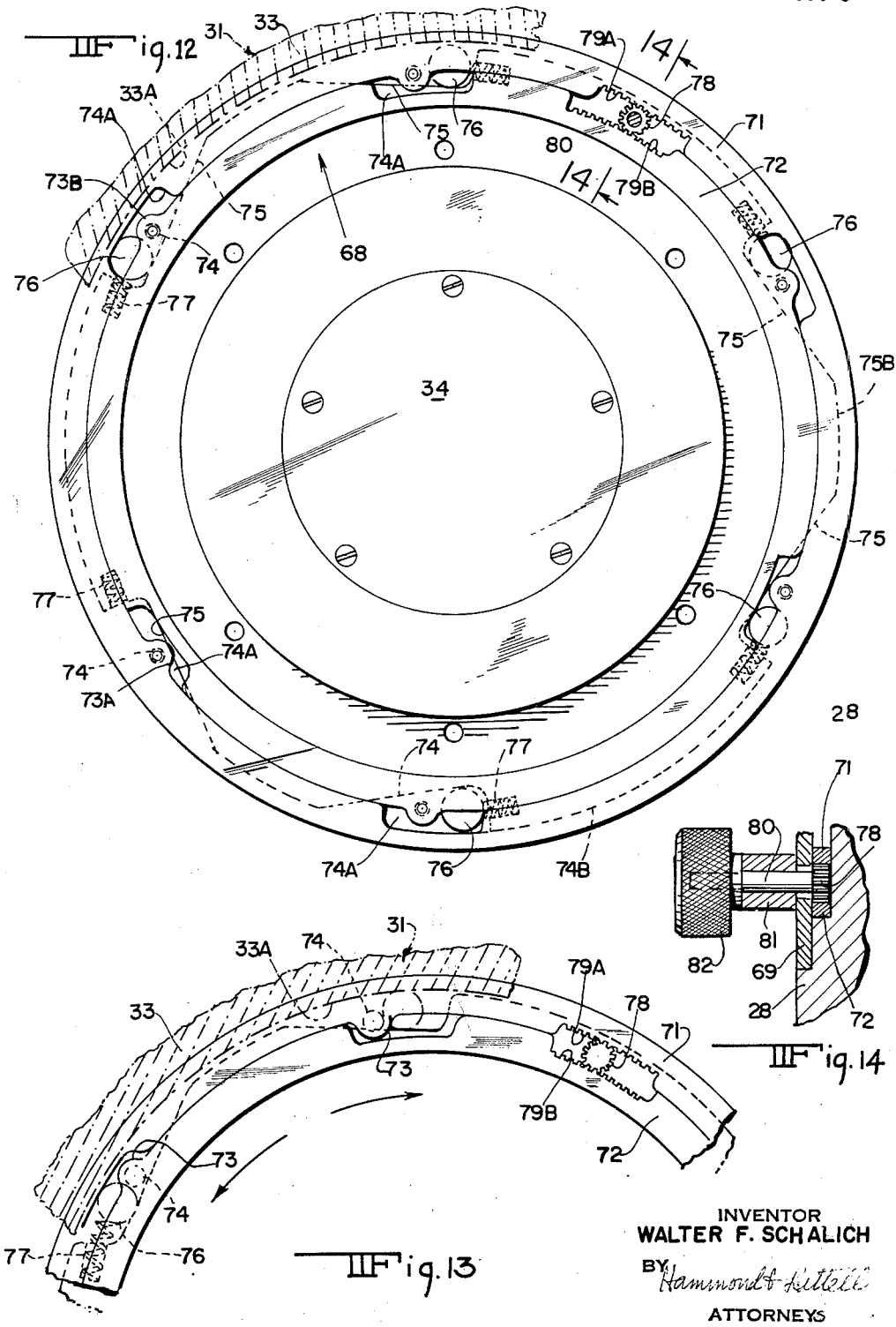

United States Patent Office 3,070,147
Patented Dec. 25, 1962

3,070,147
STRETCH GAUGE MEASURING AND STRETCH STROKE LIMITING DEVICE
Walter F. Schalich, Bayside, N.Y., assignor to Loma Machine Manufacturing Co., Inc., New York, N.Y., a corporation of New York
Filed Oct. 31, 1960, Ser. No. 66,184
6 Claims. (Cl. 153—35)

This invention relates to a measuring device of the extensometer type for measuring the elongation of long metal shapes under stress. It more particularly relates to a stretch gauge measuring and stretch stroke limiting device for use in the elongation and straightening of extruded metal objects.

In the production of extruded metal shapes, a heated billet of metal is forced under compressive forces in an extrusion press through a die having an opening corresponding to a desired cross-section of the extruded object. In such a method, the extrusions are usually somewhat bowed and twisted along their length due to internal stresses and must be straightened. This is accomplished by stretching in an apparatus having a fixed head for clamping one end of the metal object or extrusion and a movable head which is clamped to the other end. The movable head may also rotate or be rotated to provide for detwisting the object and may be moved by hydraulic or other means to stretch the metal object, thus realigning the internal stresses and detwisting and giving a permanent set which removes the bow and leaves the object straight in the linear axis. Rolled sheets are also stretched in a similar manner to remove deformities which sometimes occur in a rolling operation.

It is desirable to measure the length of stretch being imparted to an object, and where a number of similar objects are to be stretched to the same identical length to be able to do so, yet no practical and accurate means has been produced for this purpose.

I have now developed a measuring device which operates by roller contact with the frame of the moving head of a stretching machine. My measuring device may be preset for a desired stretching length and automatically stops the stretching at the appropriate length. If the stretching is stopped before this time for any reason, the exact amount of stretch given to the metal object is shown on a circular dial each time an object is stretched. Moreover, by a novel clutch and connector arrangement in my device, which will be described in subsequent paragraphs, the device may be preset for a desired amount of stretching whereupon the stretching action is automatically stopped and the device automatically resets itself for another like stretching cycle.

It is accordingly an object of my invention to provide a gauge which will accurately measure the amount of stretch imparted to a metal object, during the stretching operation.

Another object is to provide a stretch stroke limiting device which may be preset to a given amount of stretch and will automatically limit the stretching cycle to this amount.

A further object is to provide a stretch stroke limiting device which automatically resets itself for a preset amount of stretch after each stretching cycle.

Yet another object is to provide a clutch and connector mechanism in a gauge device for use in stretching of extruded, rolled or drawn metal shapes, whereby the device may be set to operate either as a single cycle measuring and stretch stroke limiting device or as a preset automatic repeat measuring and stroke limiting device.

Still another object is to provide a damping mechanism for an automatic stretch measuring and stretch stroke limiting device.

These and other objects of my invention will become apparent as the description thereof proceeds.

The invention may be more fully understood by reference to the figures in which:

FIG. 2a is a reduced scale plan view of the frame or gauge body of my stretch gauge.

FIG. 3 is a front view of the gauge showing the dial and the pivot mounting, and with parts broken away to show the damping mechanism.

FIG. 4 is a rear view of the gauge showing the stroke limiting contact means.

FIG. 5 shows a stationary element of the damping mechanism.

FIG. 6 shows a moving element of the damping mechanism.

FIG. 7 is a front view of the scale body.

FIG. 8 is a partial cross-sectional view of the scale body taken along the lines 8—8 of FIG. 7.

FIG. 9 is a front view of the connector.

FIG. 10 is a cross-sectional side view of the connector taken along the lines 10—10 of FIG. 9.

FIG. 12 shows the clutch mechanism in the free position.

FIG. 13 shows a partial view of the clutch mechanism in a locked position.

FIG. 14 is a cross-section view of the clutch rings taken along the lines 14—14 of FIG. 12 showing the pinion gear.

Figure 1:
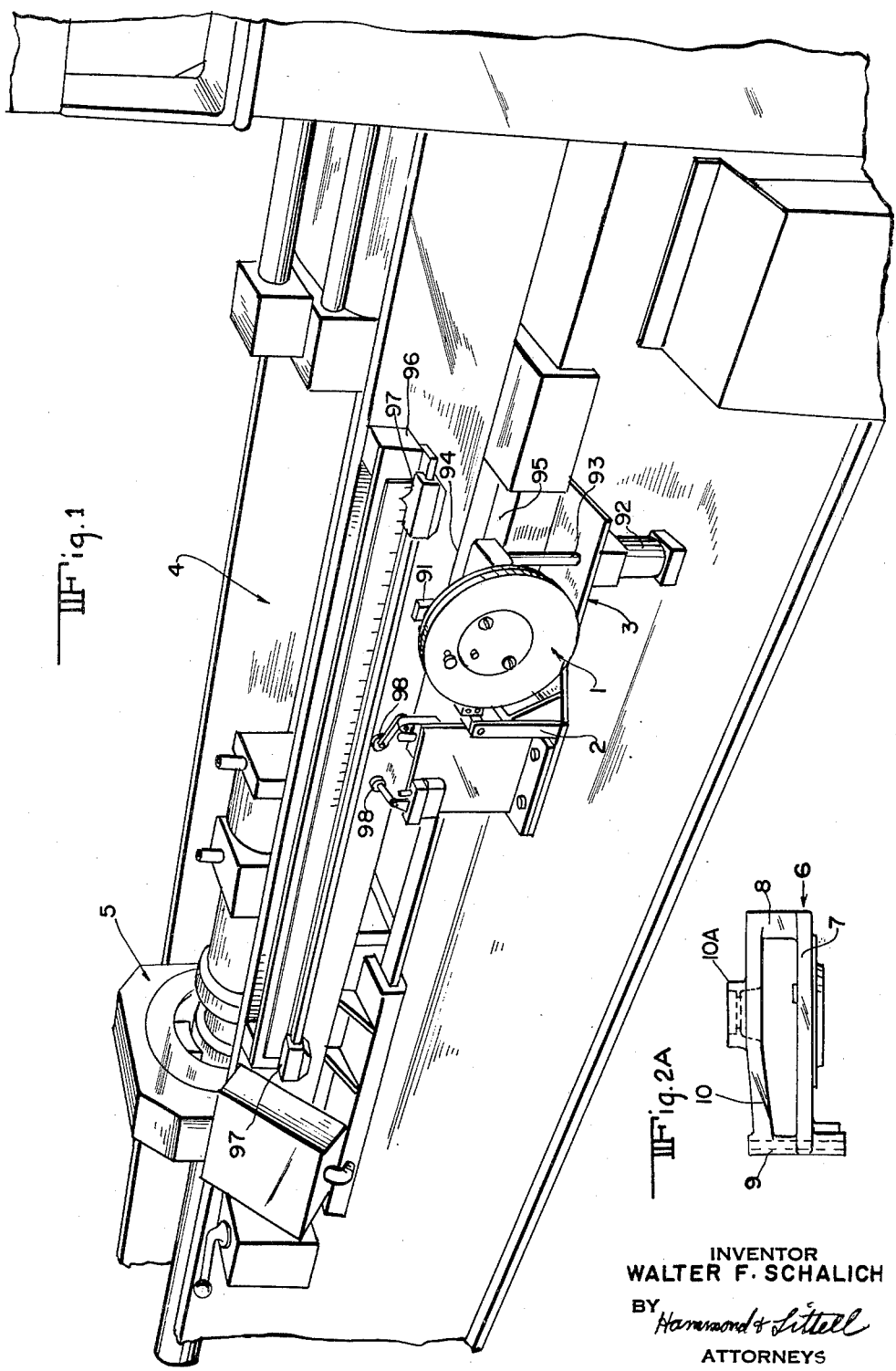
FIG. 1 is a diagrammatic partial view of an apparatus for stretching extruded, roller or drawn metal shapes showing the location and mounting of the gauge device thereon.

Referring to the figures, which illustrate preferred embodiments of my invention, gauge 1 is pivotally mounted on uprights 2 of bracket 3, which is in turn mounted on the frame of stretching and/or detwisting apparatus 4 (see FIG. 1). The stretching and detwisting apparatus may be of any commercial design as well known in the art, which has a stationary clamping head, not shown, and a moving clamping head 5, which may or may not rotate. In operation of the stretching machine, the material is clamped in the stationary head, not shown, in FIG. 1 and in the movable head 5 and the movable head 5 is moved away from the stationary head by hydraulic or pneumatic rams (not shown) to stretch the object clamped in the two heads.

The gauge comprises a gauge body 6 having a roughly circular front portion 7, connected to a frame comprising rearwardly extending arms 8 and 9 which are connected by cross-member 10 having a central hub 10A therein. Arm 9 is bored and fitted with pin 11 to form a pivot in uprights 2 of bracket 3 for gauge body 6.

Shaft 12 passes through an axial bore 13 in the hub 10A of cross member 10, and is supported by a ball bearing 14. Bearing 14 abuts a shoulder 15 on shaft 12 thus holding shaft 12 in place, and the bearing is in turn held in place against a shoulder formed by a counter bore in hub 10A by sealing plate or cover 16 secured by screws 17. A roller 18 is fitted on the end of shaft 12 by a key 19 fitting in keyways 19A of roller 18 and 19B of shaft 12. Washers 20 and nut 21 on the threaded end of shaft 12 hold roller 18 on the shaft.

Connector element 22 (see FIGS. 2, 9 and 10) is fitted on shaft 12 between the front part 7 and the rear part 10 of the frame of gauge body 6, the shaft passing through an axial bore in the connector. Connector 22 is held rigid on shaft 12 by key 23 which fits into keyway 24 in connector 22 and keyway 25 of shaft 12. A shim 26 abuts the rear of connector 22 and external retaining ring 27 which fits into an annular groove in shaft 12 against shim 26, holds connector 22 in place on the shaft.

Scale body 28 fits into the front of gauge body 6 through hole 29 and is held in place by bushing 30. Holding ring 31 is attached to the front outer periphery of gauge body element 7 by bolts 32. Flange 33 on ring 31 extends over the outer edge of scale body 28, holding it securely within the gauge body. A blind sealing plate 34 is inserted into a counter bore of the axial bore of scale body 28 and is secured by bolts 35. Plate 34 supports a ball bearing 36 into which the forward end of shaft 12 is inserted. Bearing 36 is held in place by a shoulder on shaft 12.

A torsion spring 37 joins connector 22 and scale body 28. Spring 37 fits within the axial bore of scale body 28 and a counter bore in a forwardly extending cup 38 of connector 22. Spring 37 is inserted into hole 39 of connector 22 at one end and rests against the shoulder formed by the counter bore of the connector. At the other end, spring 37 extends into hole 40 of sealing plate 34. Spring 37 is loaded during the assembly of the device by turning plate 34 a full turn clockwise prior to attaching the plate with bolts 35. The function of spring 37 will be described in greater detail subsequently.

Figure 2:
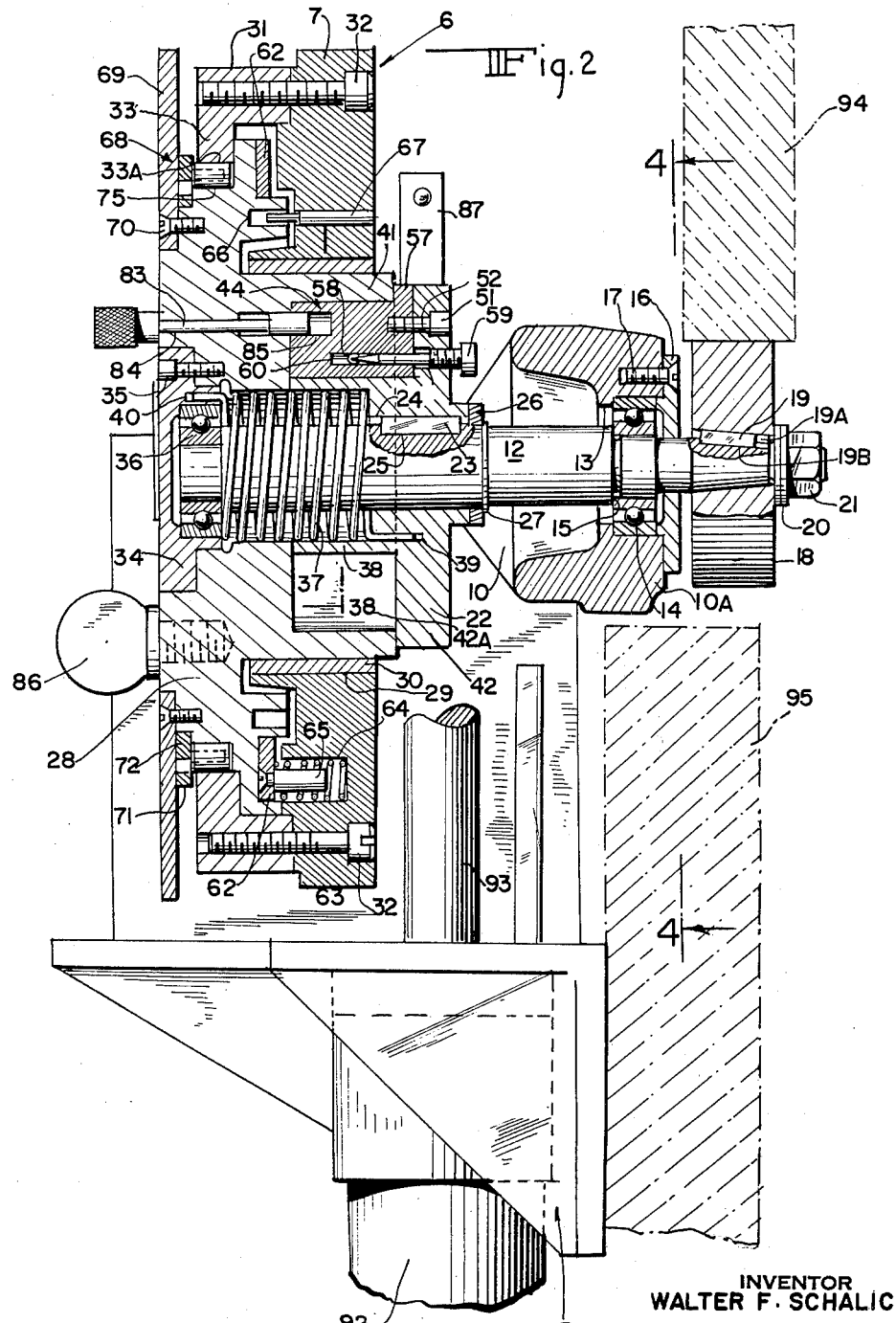
FIG. 2 is a cross-sectional side view of the gauge device taken along the lines 2—2 of FIG. 3 and the mounting bracket.

The rear side of scale body 28 is counter bored to provide a cup like rim 41 which is of such length that it abuts flange 42 of connector 22. In like manner, the cup rim 38 of connector 22 extends within the rim 41 until it abuts scale body 28 at the shoulder formed by the counterbore. Thus, an annular air space 42A is provided between the rims 38 and 41 extending around the circumference of rim 38. Within air space 42A, housings 43 and 44 are provided for a damping mechanism (see FIGS. 3, 5 and 6). The curved top of housing 43 is inserted in similarly curved slot 43A of scale body 28 (see FIG. 11) and held in place by a bolt passing through hole 45 of scale body 28 and into hole 46 of housing 43. A flat plate 47 fits into slot 48 of housing 43 and is urged outwardly by flat spring 49. The upper edge of housing 43 extends into the inner surface of rim 41 and plate 47 rides on the surface (within air space 42A) of rim 38 and extends from the shoulder of scale body 28 to flange 42 of connector 22, thus forming a seal across air space 42A. Similarly, another seal is provided across air space 42A by housing 44 which projects into slot 50 of connector 22 (see FIGS. 9 and 10) and is held in place by bolt 51 extending through hole 52 of connector 22 and into hole 53 of housing 44 (FIG. 2). A flat plate 54 fits into slot 55 of housing 44 against flat spring 56. Housing 44 has a rim 57 which abuts the end of rim 41. An air passage 58 extends through housing 44 and communicates with both sides thereof (see FIGS 6 and 11). The size of the air passage 58 can be controlled by a needle valve 59 which passes through an opening 59A in flange 42 and into a hole 60 which intersects air passage 58. Thus the passage of air from the air space 61, formed when housings 43 and 44 are separated, as illustrated by the dotted line and full line position of housing 44 in FIG. 11, into air space 42A can be controlled to regulate the speed at which the housings move toward each other to produce a damping action during operation of the gauge.

A friction ring 62 is mounted on a shoulder on the rear side of scale body 28. Ring 62 remains stationary and is kept in contact with the scale body by a plurality of helical springs in openings 64 of gauge element 7, the springs being held in position by studs 65 screwed to ring 62. An annular groove 66 (FIG. 2) is provided in scale body 28 extending in an arc of 300°. A pin 67 extends through part 7 of the gauge body and into groove 66 to limit the angular rotation of scale body 28.

A clutch mechanism 68 fits on a shoulder around the periphery of the front of gauge body 28. The clutch mechanism is held in place by scale 69 bolted by a plurality of bolts 70 to the front of scale body 28. Clutch mechanism 68 consists of an outer circular ring 71 (FIG. 12) and an inner ring 72. Each ring has a plurality of ears 73 on the facing edges with pins 74, the ears extending into indentations 74A in the adjacent ring. The ears are so arranged that ears 73A on outer ring 71, alternate with ears 73B on inner ring 72. Around the edge 74B (see FIGS. 7 and 12) of scale body 28 in contact with the inner edge 33A of flange 33 of holding ring 31 a number of inclined planes 75 are milled. These planes are alternately inclined up to left and right to form planes 75A and 75B respectively. Rollers 76 rest at the bottom of inclined planes 75 and are held in place by springs 77 and pins 74 which extend into the area above the planes 75 on the uphill side of the rollers. A pinion 78 (FIG. 13) and racks 79A and 79B on rings 71 and 72 respectively make it possible to move the rings in opposing directions thus moving pins 74 and releasing rollers 76 which move uphill under the force of springs 77 and press against edge 33A to lock scale body 28 in gauge body element 7. Pinion 78 is connected to a dowel pin 80 passing through scale 69 and bushing 81, attached to scale 69. Knob 82 is attached to the end of dowel pin 80 (see FIG. 14).

A pin 83 fits into a hole 84 in scale body 28 and is of sufficient length to extend into hole 85 of housing 44. Pin 83 may be pulled out to clear housing 44, where it is stopped by a counter-sunk shoulder in hole 84, so that scale body 28 and connector 22 may rotate independently. Pin 83 may also be pushed in so that it extends into housing 44 to connect scale body 28 to connector 22 so that the two rotate together as a unit.

Scale 69 has appropriate indicia around its circumference to indicate the stretching length. The zero point is normally opposite a vernier scale 85A mounted on gauge body element 7 near pivot pin 11. Thumb screws 86 are mounted on the front of scale body 28 to facilitate setting of the gauge.

A limit switch bracket 87 is mounted on flange 42 of connector 22 by bolts 88. An adjustable screw 90 is provided in bracket 87 to regulate contact with limit switch 91 (see FIG. 11).

The device described makes it possible (a) to measure the stretching length, whereby the scale visibly moves clockwise in the direction of zero; or (b) the scale is locked at a predetermined stretching length and this length may be repeated indefinitely.

The setting in the first case (a) is as follows:

(1) Pin 83 which is on the scale 69 and passes through scale body 28 is pushed inward to connect the connector 22 with scale body 28 through housing 44.

(2) Locking device knob 82 is turned in direction "free" as indicated on the scale 69 to unlock the scale body 28 from stationary holding ring 31.

(3) Scale 69 is set to the desired stretching length and is held in position by means of a built-in friction device 62. After a pressure switch (not shown) has actuated the air cylinder solenoid 92 (FIG. 1) and piston 93, the roller 18 (FIG. 2) will be pressed against tie bar 94 forming part of the stretcher mechanism and stretching begins. The bar 94 moves with the movable stretcher head 5 and rotates roller 18 and the gauge mechanism connected with roller 18 as illustrated in FIG. 2. When the scale 69 reaches the zero position opposite vernier 85, the length of the desired stretch, the limit switch 91 is actuated by screw 90 which shuts off the movement of the stretching head 5 and stretching stops. For the next stretching cycle, the scale 69 has to be set again to the desired stretching length.

For setting the gauge to operate in accordance with the second case (b) the operation is as follows:

(1) Pin 83 on the scale 69 is pulled out in order to disconnect the connector 22 from scale body 28 (this connection being through the housing 44).

(2) Scale 69 is set to the desired stretching length.

(3) Locking device knob 82 is turned in the direction "lock" as indicated on the scale 69 to lock the rings 71 and 72 together and scale body 28 to gauge body element 7.

(4) The scale 69 now will not change the setting, since it is held in place with said locking device. The connector 22 will begin to move back to zero position when roller 18 is pressed against tie bar 94 and the stretching starts. As soon as the connector has reached the zero position indicating that the desired stretch has been made, the limit switch 91 is actuated again; the stretching stops, simultaneously releasing roller 18 from tie bar 94. The connector 22 is then turned counter-clockwise by means of torsional spring 37 until it reaches the setting of the scale 69 indicating the length of the next stretch. At this point it is automatically in the starting position for the next stretching cycle. This may be repeated indefinitely without additional settings.

Considering the above functions in greater detail, the gauge body 6 is pivotally mounted by pin 11 onto bracket 2. When not in action, a boss on the center part of the arm 8 rests on the stationary frame 95 on which the bracket 3 is mounted as well. When in operation, the gauge body 6 is lifted upwards by the piston rod 93 of the cylinder 92, thereby pressing the roller 18 firmly against the tie bar 94. With the tie bar 94 in motion, the roller 18 will turn the shaft 12, actuating the measuring. The connector 22 is keyed to the shaft 12. This connector may either be connected to the scale body 28 with pin 83 or be disconnected with pin 83 withdrawn.

In case of the latter setting, the connector 22 is normally held by the power of the torsional spring 37 with housing 44, against the housing 43, which is connected into scale body 28 (see FIG. 3). With gauge body 6 resting on said frame 95, the scale body 28, guided in bushing 30, may now be turned counter-clockwise to the desired position, using the thumb screws 86. A friction device, consisting of friction ring 62 and springs 63, is incorporated so that the scale body 28 is not completely loose at its rotating movement. Pin 67 in ring 7 extends into a groove 66 of the scale body 28 and provides positive end positions for the rotation of scale body 28. This groove 66 permits a motion of the scale body 28 of 300°. As indicated in FIG. 3, the housing 44 in connector 22 is held by spring pressure of preloaded spring 37 against housing 43. When the scale body 28 is turned, the connector 22 follows this movement, since spring 37 maintains the contact between damper housing 43 and 44, whereby the adjustable screw 90 is moved away from the limit switch 91 as illustrated by the full line position of damper housings 43 and 44 of FIG. 11.

When the desired stretching length has been set, the scale body 28 is locked in gauge body 6. This is done by turning the knob 82 counter-clockwise, thereby actuating the locking device 68 through rings 71 and 72 which will hold the scale body 28 firmly in place in both directions as illustrated in FIG. 13. The locking device 68 of FIG. 13 consists of the rings 71 and 72 and a set of six rollers 76 which are pushed upwards on inclined surfaces 75 until they come in contact with flange 33 of holding ring 31, attached to ring element 7. Until this time, the rollers are in position as shown in FIG. 12. By turning the pinion 78 the rings 71 and 72 are moved in opposite directions against each other, thereby releasing by means of the holding pins 74 the corresponding rollers 76, causing locking in both directions. Thus, three rollers are acting in a clockwise direction and three rollers in a counter-clockwise direction.

By the above steps, a setting of the scale for repeat measurement is completed. The connector 22 is now able to turn in clockwise direction only, which is backwards to its zero position. This occurs when the predetermined pressure on the pressure switch (and main cylinder as well) is reached. Then the air cylinder 92 acts, thereby pressing the roller 18 against the tie bar 94, and measuring starts. This will proceed until the connector 22 has turned so far backwards that screw 90 operates limit switch 91, thereby stopping the stretching cycle. This position is shown by the broken line position of housing 44 in FIG. 11. At the same moment, the roller 18 is released from contact with the tie bar 94. The connector 22 will now move counterclockwise under the force of the torsion spring 37 until the housing 43 and 44 contact each other again as shown by the full line position in FIG. 11. The connector 22 is now in starting position for the next measuring cycle.

The speed of the return movement of the connector 22, being under the torsional force of the spring 37, is controlled by means of the vane type sealing plates designated plates 47 and 54 as previously described, and the throttle valve 59A operating in hole 60 to control the rate at which air passes through the passage 58. Plate 47 is in housing 43, plate 54 is in housing 44.

Figure 11:
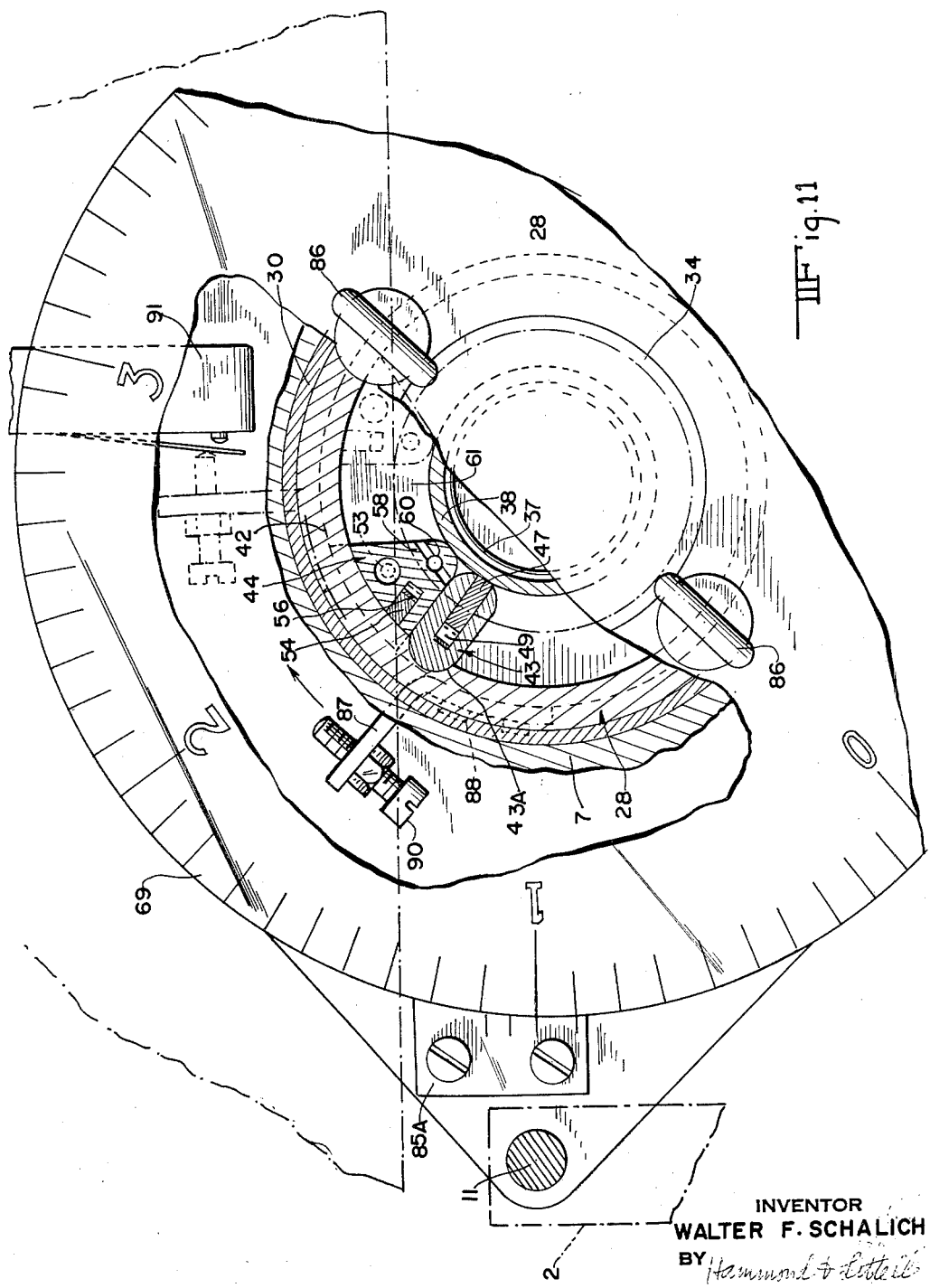
FIG. 11 is an enlarged partial front view of the gauge device with parts broken away and parts shown in full and dotted line to illustrate the operation of the damping mechanism and stretch stroke limiting switch.

The housing 44 with inserted plate 54 (under pressure from flat spring 56) moves back and forth in said space 42 (see FIG. 11). When housing 44 moves in this space the sealing plate 54 will prevent the air from flowing freely past the housing so that the principal escape of air from the chamber provided between the housings 43 and 44 is through the throttled passage 58.

In order to regulate time for the return movement of the connector 22, the adjusting valve 59A is employed, which makes it possible to make adjustment from the outside by means of the knob 59 which regulates the size of the passage through the hole 58.

The previous description has referred to the type of setting whereby a predetermined stretching length may be repeated. The following description relates to the use of the gauge for separate individual measurements.

In setting the gauge for individual measurements, the connector 22 is connected to the scale body 28 by pushing pin 83 inward into hole 85 of housing 44 which is rigidly connected with connector 22.

The following parts are now out of function: Spring 37 and the parts related to the cushioning device, housings 43 and 44 since these housings are now fixed in contact with one another. In addition, locking clutch device 62, operates in the "free" position as shown in FIG. 12.

The roller 18 is now directly connected to the scale body 28 through connector 22 fixed to scale body 28 with pin 83. The scale body is free to rotate within gauge body element 7 since the locking clutch mechanism is free. A setting of the scale is now made by turning the dial with thumb screws 85 as previously described. The position of housings 43 and 44 will be as shown in full line in FIG. 11. Stretching and measuring may now be accomplished by starting the stretching machine which starting operation also operates cylinder 92 causing piston 93 to lift the gauge and bring roller 18 into contact with bar 94 of the stretching machine. During the stretching the dial 69 moves visibly backwards toward the zero mark on vernier scale 85A as roller 18 turns scale body 28 through the connections described until contact 90 operates the limit switch 91 or, and this is an important operture of my invention, the stretching is interrupted for other reasons, either by an additional safety pressure switch or by hand. If such interruption occurs, the scale will remain in the position it has reached and it is possible to read on the dial 69 the amount of stretching that has occurred.

When the dial 69 of scale body 28 has returned to zero, the housings 43 and 44 are in the position shown in FIG. 3, since they are locked in contact throughout the entire gauge operation during use of the gauge for individual measurements. The dial 69 is then reset for the next individual measurement.

A scale 96 with adjustable limit stops 97 is mounted on the movable bar 94 of the stretching machine. The stops 97 cooperate with limit switches 98 to control the return movement of the movable head 5 and to control the maximum stroke or movement of the stretching machine. Other than to control the return of the movable stretching head to the same adjusted point each time, these elements form no part of the present invention.

I have set forth certain specific embodiments and preferred modes of operation of my invention in the above description, and the drawings. However, there is no intention to limit the invention thereto. It will be readily apparent that various changes and modifications may be made in the invention without departing from the spirit of the disclosure or the scope of the following claims.

I claim:

1. A stretch measuring and stretch stroke limiting device for a metal stretching machine comprising a gauge body having an axial bore, a shaft in said bore supported at each end, a roller fixedly mounted on one end of said shaft, a circular scale body mounted on the other end of said shaft, locking means to selectively lock said scale body against said gauge body, a connector ring fixed mounted on said shaft between said scale body and said roller, a torsion spring connected between said scale body and said connector ring, means to selectively connect said connector ring rigidly to said scale body, and means to bring said roller into contact with a mobile part of a stretching machine wherein said scale body is selectively connected to said connector ring for stretch measuring and locked against said gauge body for stretch stroke limiting.

2. A stretch measuring and stretch stroke limiting device for a metal stretching machine comprising a gauge body having an axial bore, a shaft in said bore supported at each end, a roller fixedly mounted on one end of said shaft, a circular scale body mounted on the other end of said shaft, friction means to hold said scale body firmly against said gauge body, locking means to selectively lock said scale body against said gauge body, a connector ring fixed mounted on said shaft between said scale body and said roller, means on said connector for operating a limit switch, a torsion spring connected between said scale body and said connector ring, means to selectively connect said connector ring rigidly to said scale body, pivot means on one side of said gauge body parallel to said axial bore, and means to rotate said gauge body about said pivot means to bring said roller into contact with a mobile part of a stretching machine wherein said scale body is selectively connected to said connector ring for stretch measuring and locked against said gauge body for stretch stroke limiting.

3. A stretch measuring and stretch stroke limiting device for a metal stretching machine comprising a gauge body having an axial bore, a shaft in said bore supported at each end, a roller fixedly mounted on one end of said shaft, a circular scale body mounted on the other end of said shaft, fitting in said axial bore and rotatable independent of said shaft, friction means to hold said scale body firmly against said gauge body, means to selectively lock said scale body against said gauge body, a connector ring fixed mounted on said shaft between said scale body and said roller, a torsion spring connected between said scale body and said connector ring, means to selectively connect said connector ring rigidly to said scale body, means to bring said roller into contact with a mobile part of a stretching machine, and damping means to slow the rate of return rotational movement between said scale body and said connector when said scale body is locked against said gauge body wherein said scale body is selectively connected to said connector ring for stretch measuring and locked against said gauge body for stretch stroke limiting.

4. A stretch measuring and stretch stroke limiting device for a metal stretching machine comprising a gauge body having an axial bore, a shaft in said bore supported at each end, a roller fixedly mounted on one end of said shaft, a circular scale body mounted on the other end of said shaft, locking means to selectively lock said scale body against said gauge body, comprising an overriding clutch locking mechanism having a plurality of inclined planes around the periphery of said scale body, said planes inclined alternately to right and left, a roller on each inclined plane, means to exert a force against said rollers urging them up said planes to contact said gauge body, a pair of concentric rings having means to hold said rollers at the lowest point of said planes and out of contact with said gauge body, means to release said holding means to cause said rollers to move up said planes to lock said scale body rigidly with said gauge body, a connector ring fixed mounted on said shaft between said scale body and said roller, a torsion spring connected between said scale body and said connector ring, means to selectively connect said connector ring rigidly to said scale body, and means to bring said roller into contact with a mobile part of a stretching machine wherein said scale body is selectively connected to said connector ring for stretch measuring and locked against said gauge body for stretch stroke limiting.

5. A stretch measuring and stretch stroke limiting device comprising a gauge body having an axial bore, a shaft in said bore supported at each end, a roller fixedly mounted on one end of said shaft, a circular scale body mounted on the other end of said shaft, locking means to selectively lock said scale body against said gauge body, a concentric connector ring fixed mounted on said shaft between said scale body and said roller fitting partially within said scale body to form an annular air space therebetween, a damping mechanism comprising a housing inserted into said scale body and closing said airspace, a second housing inserted into said connector and closing said airspace, both housings adapted to rotate with the elements in which they are inserted, a passage through one of said housings communicating from the space enclosed by said housings when said housings are separated and the annular air space outside said housings, and means to control the size of said passage, a torsion spring connected between said scale body and said connector ring, means to selectively connect said connector ring rigidly to said scale body, and means to bring said roller into contact with a mobile part of a stretching machine wherein said scale body is selectively connected to said connector ring for stretch measuring and locked against said gauge body for stretch stroke limiting.

6. A stretch measuring and stretch stroke limiting device for a metal stretching machine comprising a gauge body having an axial bore, a shaft in said bore supported at each end, a roller fixedly mounted on one end of said shaft, a circular scale body mounted on the other end of said shaft, locking means to selectively lock said scale body against said gauge body, comprising an overriding clutch locking mechanism having a plurality of inclined planes around the periphery of said scale body, said planes inclined alternately to right and left, a roller on each inclined plane, means to exert a force against said rollers urging them up said planes to contact said gauge body, a pair of concentric rings having means to hold said rollers at the lowest point of said planes and out of contact with said gauge body, means to release said holding means to cause said rollers to move up said planes to lock said scale body rigidly with said gauge body, a concentric connector ring fixed mounted on said shaft between said scale body and said roller, fitting partially within said scale body to form an annular airspace therebetween, a damping mechanism comprising a housing inserted into one of said scale body and closing said airspace, a second housing inserted into said connector and closing said airspace, both housings adapted to rotate with the elements in which they are inserted, a passage through one of said housings communicating from the space enclosed by said housings when said housings are separated and the air space outside said housings, and means to control the size of said passage, a torsion spring connected between said scale body and said connector ring, means to selectively connect said connector ring rigidly to said scale body, and means to bring said roller into contact with a mobile part of a stretching machine.

References Cited in the file of this patent

UNITED STATES PATENTS

| | | |
|---|---|---|
| 1,652,254 | Schlagenhauf | Dec. 13, 1927 |
| 1,689,024 | Hamilton et al. | Oct. 23, 1928 |
| 2,151,950 | Tyler | Mar. 28, 1939 |
| 2,876,662 | Carlstedt et al. | Mar. 10, 1959 |
| 2,999,528 | Kurtak | Sept. 12, 1961 |